US012537279B2

(12) United States Patent
Gao et al.

(10) Patent No.: US 12,537,279 B2

(45) Date of Patent: Jan. 27, 2026

(54) SPHERICAL DESIGNER ELECTROMAGNETIC SURFACE PLASMON OPEN RESONATOR

(71) Applicant: ZHEJIANG UNIVERSITY, Zhejiang (CN)

(72) Inventors: Fei Gao, Zhejiang (CN); Yuanzhen Li, Zhejiang (CN); Baile Zhang, Singapore (SG); Hongsheng Chen, Zhejiang (CN)

(73) Assignee: ZHEJIANG UNIVERSITY, Zhejiang (CN)

(*) Notice: Subject to any disclaimer, the term of this patent is extended or adjusted under 35 U.S.C. 154(b) by 123 days.

(21) Appl. No.: 18/681,517

(22) PCT Filed: Aug. 30, 2023

(86) PCT No.: PCT/CN2023/115638

§ 371 (c)(1),
(2) Date: Feb. 6, 2024

(87) PCT Pub. No.: WO2024/221678

PCT Pub. Date: Oct. 31, 2024

(65) Prior Publication Data

US 2025/0226564 A1 Jul. 10, 2025

(30) Foreign Application Priority Data

Apr. 28, 2023 (CN) ......................... 202310476316.7

(51) Int. Cl.
*H01P 7/00* (2006.01)

(52) U.S. Cl.
CPC ...................................... *H01P 7/00* (2013.01)

(58) Field of Classification Search
CPC .............. H01P 7/00; H01P 7/10; Y02D 30/70
(Continued)

(56) References Cited

U.S. PATENT DOCUMENTS

2022/0112931 A1* 4/2022 Lee .......................... F16F 7/116

FOREIGN PATENT DOCUMENTS

CN 108767380 11/2018
CN 115832713 3/2023
(Continued)

OTHER PUBLICATIONS

Grigorios P. Zouros et al., "Complex Resonances of Anisotropic Spherical Resonators", IEEE Transactions On Antennas and Propagation, Oct. 31, 2018, pp. 5282-5290, vol. 66, No. 10.
(Continued)

*Primary Examiner* — Jorge L Salazar, Jr.
(74) *Attorney, Agent, or Firm* — JCIPRNET

(57) ABSTRACT

A spherical designer electromagnetic surface plasmon open resonator is provided. The open resonator includes a resonator inner core and a resonator outer shell. The resonator inner core is located in an inner center of the resonator outer shell, and the resonator inner core and the resonator outer shell are coaxial. The disclosure provides a device that implements the superscattering function for incident waves in all incident directions and in all polarization directions, and a spherical open resonator is implemented. The scattering cross section of the disclosure can be more than five times greater than that of a metal sphere of the same size, and the operating frequency can be flexibly designed. By utilizing the characteristic that the scattering cross section of the spherical designer electromagnetic surface plasmon resonator is much greater than its own geometric cross section, the electromagnetic super-scattering device can be implemented.

9 Claims, 8 Drawing Sheets

(58) Field of Classification Search
USPC .......................................... 333/219, 222–226
See application file for complete search history.

(56) References Cited

FOREIGN PATENT DOCUMENTS

| | | |
|---|---|---|
| CN | 116526106 | 8/2023 |
| WO | 2015129757 | 9/2015 |

OTHER PUBLICATIONS

"International Search Report (Form PCT/ISA/210) of PCT/CN2023/115638", mailed on Nov. 23, 2023, pp. 1-3.
"Written Opinion of the International Searching Authority (Form PCT/ISA/237) of PCT/CN2023/115638", mailed on Nov. 23, 2023, pp. 1-4.

* cited by examiner

SPHERICAL DESIGNER ELECTROMAGNETIC SURFACE PLASMON OPEN RESONATOR

CROSS-REFERENCE TO RELATED APPLICATION

This application is a 371 of international application of PCT application serial no. PCT/CN2023/115638, filed on Aug. 30, 2023, which claims the priority benefit of China application no. 202310476316.7, filed on Apr. 28, 2023. The entirety of each of the above mentioned patent applications is hereby incorporated by reference herein and made a part of this specification.

TECHNICAL FIELD

The disclosure relates to an open resonator and a superscattering device, in particular, relates to a spherical designer electromagnetic surface plasmon open resonator.

DESCRIPTION OF RELATED ART

The regulation of electromagnetic waves runs through the entire history of scientific development. When electromagnetic waves irradiate to an object, the electromagnetic wave cannot completely propagate behind the object, but will be scattered on the object. The strength of scattering is characterized by the scattering cross section. Objects with larger scattering cross section can capture electromagnetic waves from a wider expanse, making them suitable for use in energy harvesting, wide-aperture antenna design, biological detector, Rydberg atoms and other scenarios where weak electromagnetic signals need to be detected. Generally, the larger the geometric size of the object, the stronger its scattering ability. For subwavelength objects, that is, the objects whose geometric scales are smaller than the wavelength of electromagnetic waves, there is a limit to their scattering potential, known as the single-channel scattering limit. The existence of the single-channel scattering limit severely limits the need for miniaturization and integration of the receiving and detecting equipment. Therefore, how to break through the single-channel scattering limit of small-sized objects has become an important scientific challenge for the miniaturization of the high-sensitivity antennas and detection devices.

In recent years, scholars have proposed the concept of superscatterer, which refers to the subwavelength objects that break the single-channel scattering limit and achieve a scatter cross section far greater than the geometric size of the scatterer. However, the current strategies to increase the scattering cross section can only respond to the incident electromagnetic waves in a two-dimensional situation typically require specific polarization of the incident plane. Consequently, these approaches cannot enhance scattering for waves coming from all possible incident directions and for all polarization states.

SUMMARY

In order to solve the problems found in the BACKGROUND, the disclosure provides a superscattering device with spherical designer electromagnetic surface plasmon open resonator.

The technical solution adopted by the disclosure includes the following:

I. Spherical Designer Electromagnetic Surface Plasmon Open Resonator:

The open resonator includes a resonator inner core and a resonator outer shell. The resonator inner core is located at the central interior of the resonator outer shell, and the resonator inner core and the resonator outer shell are coaxial.

The resonator inner core is a sphere, and the resonator outer shell includes a plurality of fan-ring-shaped strip-shaped bars. One end of each strip-shaped bar in a length direction is an inner arc bottom surface of the strip-shaped bar, and the other end of each strip-shaped bar in the length direction is an outer arc bottom surface of the strip-shaped bar. The strip-shaped bars are evenly distributed on a spherical surface of the resonator inner core in directions of an azimuthal angle θ and a polar angle ϕ with a duty ratio α. The inner arc bottom surfaces of the strip-shaped bars are evenly spaced in an array, distributed on the spherical surface of the resonator inner core, and connected to the resonator inner core as a whole. The outer arc bottom surface of each strip-shaped bar is away from the spherical surface of the resonator inner core, and the length direction of each strip-shaped bar is the same as a radius direction of the resonator inner core.

The resonator inner core and the resonator outer shell are fabricated using metal or resin materials through 3D printing, forming a single integrated structure. The metals mentioned for this purpose include aluminum or stainless steel, which are commonly used for their conductive properties and structural integrity.

When the resonator inner core and the resonator outer shell are made of resin materials, a surface of the open resonator is evenly covered with metal powder, and the metal powder can be copper, aluminum, gold, or stainless steel, etc.

The open resonator has a scattering cross section that is more than five times greater than its own geometric cross section for linearly polarized electromagnetic waves incident from any direction.

The resonator outer shell has an effective negative refractive index n, specifically as follows:

$$n = \sqrt{ò_r},$$

where $ò_r$ is the effective negative permittivity of the resonator inner core with an outer radius r of the resonator, which can be described by Lorentz-Drude model of electrical conductivity.

The specific negative permittivity of the resonator inner core with the radius r of the resonator is as follows:

$$ò_r = 1 - \frac{f_p^2}{f^2},$$

where f is the operating frequency of the resonator, and $f_p$ is the effective plasma frequency of the resonator.

II. Application of the Open Resonator:

The open resonator is used in application of a spherical isotropic superscattering device.

III. Application of the Open Resonator:

The open resonator is used in application of a small spherical wide-aperture antenna.

IV. An Application Method of the Open Resonator:

The open resonator scatters linearly polarized electromagnetic waves incident in any direction.

The beneficial effects provided by the disclosure include the following:

1) The resonator can enhance scattering for incident waves from all incident directions and all polarization directions.
2) The resonator is open and supports spoof surface plasmon that is more likely to be coupled with an external electromagnetic wave.
3) The resonator's operating frequency can be adjusted.
4) The structure is simple and compact, and the structural size is much smaller than the operating wavelength, enabling miniaturization of the device.

In summary, the disclosure provides a device that achieves superscattering for waves incident from all incident directions and all polarization directions. Based on the adjustability of the designer electromagnetic surface plasmon resonance modes and addressing the shortcomings of existing technologies, the spherical open resonator is implemented based on the highly-efficient and directional coupling between subwavelength electromagnetic waveguides and air. The scattering cross section of the disclosure can be more than 5 times greater than that of a metal sphere of the same size. Further, the operating frequency can be flexibly designed. By utilizing the characteristic that the effective scattering cross section of the spherical designer electromagnetic surface plasmon resonator is much greater than its own geometric cross section, the electromagnetic superscattering device can be implemented. The resonator can scatter electromagnetic waves in a wider range while ensuring a small size structure and can be used in a small wide-aperture antennas, energy collectors, Rydberg atoms, etc.

In the figure: 1: resonator inner core, and 2: resonator outer shell.

DESCRIPTION OF THE EMBODIMENTS

The disclosure is further described in detail together with accompanying drawings and specific embodiments in the following paragraphs.

Figure 1:
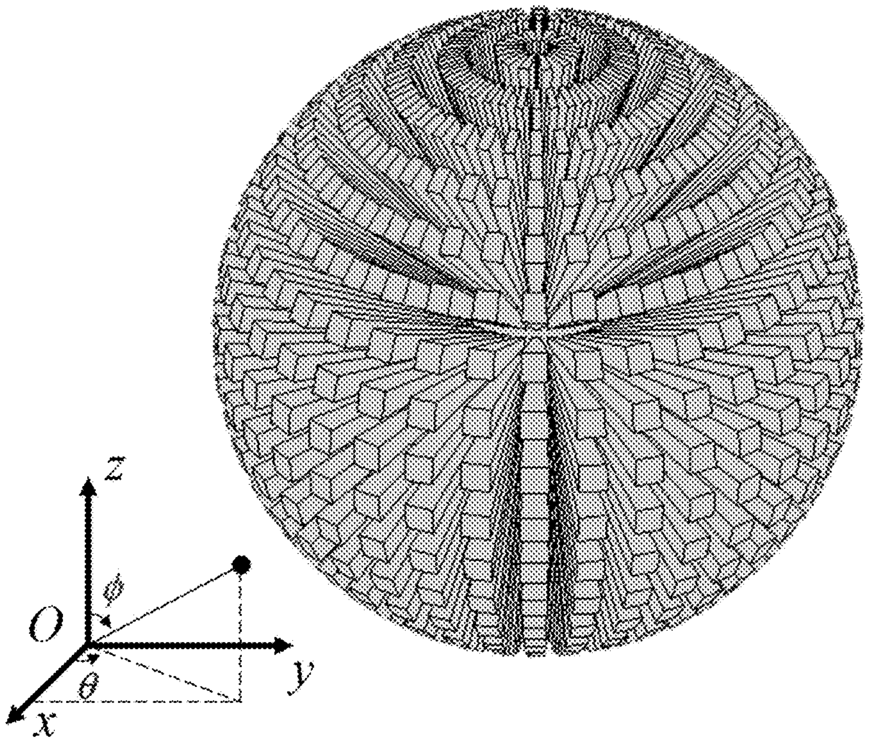
FIG. 1 is an overall structural view of an electromagnetic wave superscattering device of the disclosure.
Figure 2:
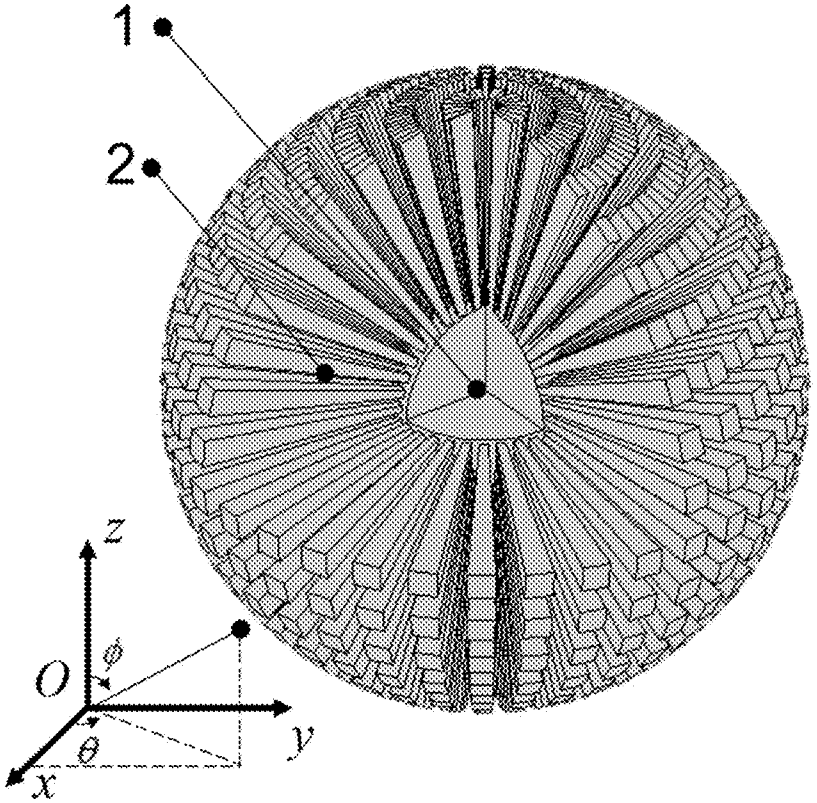
FIG. 2 is a cross-sectional view of the electromagnetic wave superscattering device of the disclosure.

As shown in FIG. 1 and FIG. 2, a spherical designer electromagnetic surface plasmon open resonator of the disclosure includes a resonator inner core 1 and a resonator outer shell 2. The resonator inner core 1 is located the internal center of the resonator shell 2, with both the resonator core and shell sharing the same axis. The open resonator has a scattering cross section over five times greater than its own geometric cross section for linearly polarized electromagnetic waves incident from any direction. The open resonator may be used for spherical superscattering device and a small spherical wide-aperture antenna. The open resonator scatters linearly polarized electromagnetic waves incident from any direction.

The resonator inner core 1 is a sphere, and the resonator outer shell 2 includes a plurality of fan-ring-shaped strip-shaped bars. One end of each strip-shaped bar in the length direction is an inner arc bottom surface of the strip-shaped bar, and the other end of each strip-shaped bar in the length direction is an outer arc bottom surface of the strip-shaped bar. The strip-shaped bars are evenly distributed on a spherical surface of the resonator inner core 1 in directions of an azimuthal angle $\theta$ and a polar angle $\phi$ with a duty ratio $\alpha$. The inner arc bottom surfaces of the strip-shaped bars are evenly spaced in an array, distributed on the spherical surface of the resonator inner core 1, and connected to the resonator inner core 1 as a whole. The outer arc bottom surface of each strip-shaped bar is away from the spherical surface of the resonator inner core 1, and the length direction of each strip-shaped bar is the same as a radius direction of the resonator inner core 1.

The resonator inner core 1 and the resonator outer shell 2 are specifically made of metal or resin materials through 3D printing, forming a single integrated structure. The metals mentioned for this purpose include aluminum or stainless steel, which are commonly used for their conductive properties and structural integrity. When the resonator inner core 1 and the resonator outer shell 2 are made of resin materials, a surface of the open resonator is evenly covered with metal powder, and the metal powder can be copper, aluminum, gold, or stainless steel, etc.

The resonator outer shell 2 has an effective negative refractive index n, specifically as follows:

$$n = \sqrt{\grave{o}_r},$$

where $\grave{o}_r$ is the effective negative permittivity of the resonator outer shell 2 with an outer radius r of the resonator, which can be described by Lorentz-Drude model of electrical conductivity.

The specific negative permittivity of the resonator outer shell 2 with the radius r of the resonator is as follows:

$$ò_r = 1 - \frac{f_p^2}{f^2},$$

where f is the operating frequency of the resonator, and $f_p$ is the effective plasma frequency of the resonator.

Figure 3A:
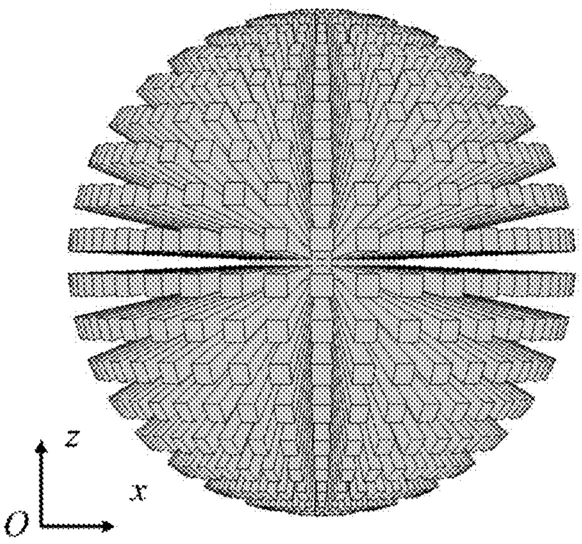
FIG. 3A is a top view of the electromagnetic wave superscattering device of the disclosure.
Figure 3B:
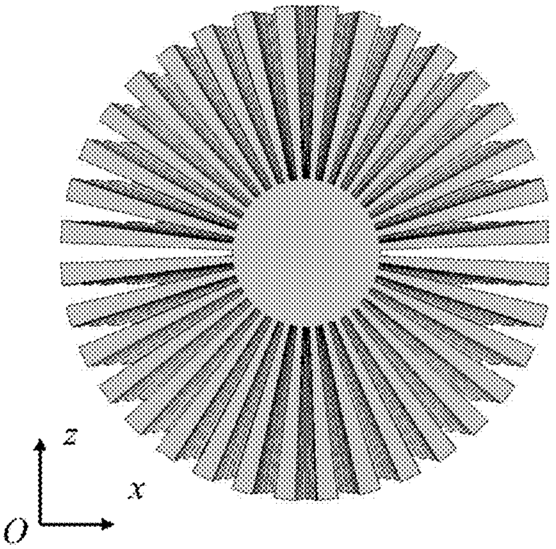
FIG. 3B is a cross-sectional top view of the electromagnetic wave superscattering device of the disclosure.
Figure 4A:
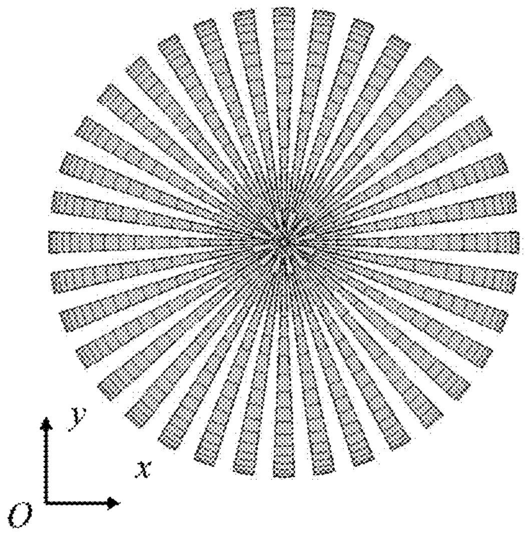
FIG. 4A is a front view of the electromagnetic wave superscattering device of the disclosure.
Figure 4B:
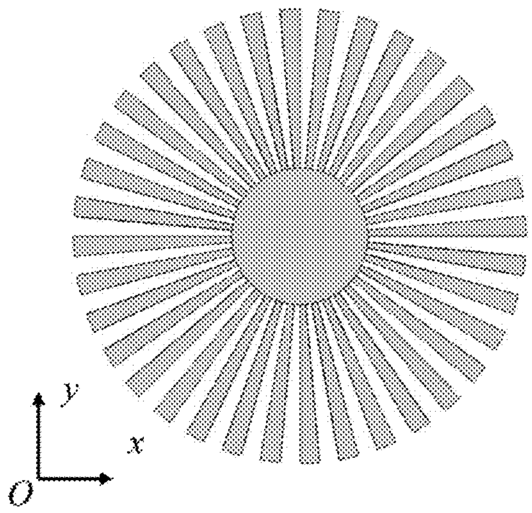
FIG. 4B is a cross-sectional front view of the electromagnetic wave superscattering device of the disclosure.

The disclosure relates to a spherical designer electromagnetic surface plasmon open resonator, and in the disclosure, spectral degeneracy of the designer electromagnetic surface plasmon resonance modes is mainly used to achieve a scattering cross section that far exceeds the geometric cross section, and a high receiving aperture antenna is implemented in combination with infeed technology. As shown in FIG. 1, it is an appearance of the open electromagnetic resonator provided by the disclosure. The resonator is placed at the origin of a coordinate system. An angle between a point on a spherical surface of the resonator and a xOz surface is an azimuth angle θ, and an angle between the point on the spherical surface of the resonator and a z-axis is a polar angle ϕ. As shown in FIG. 2, it is a three-dimensional cross-sectional view of the open electromagnetic resonator provided by the disclosure. The open resonator mainly includes a resonator inner core 1 and a resonator outer shell 2. The resonator outer shell 2 is formed by 18 rows of metal square bars arranged in a direction of the polar angle ϕ and 36 rows of metal square bars arranged in a direction of the azimuth angle θ with a height h, and the metal square bars are evenly distributed in the directions of the azimuth angle θ and the polar angle ϕ with a duty ratio α=0.5. The metal square bars are all the same in the direction of the azimuth angle θ, and the metal square bars change gradually in the direction of the polar angle ϕ. As shown in FIG. 3A and FIG. 3B, a left side view of the open electromagnetic resonator and a cross-sectional view of the open electromagnetic resonator with the azimuth angle θ=0° are shown. A spherical center angle corresponding to the square bars in the direction of the polar angle ϕ is 5°. As shown in FIG. 4A and FIG. 4B, the left side view of the open electromagnetic resonator and the cross-sectional view of the open electromagnetic resonator with the polar angle ϕ=90° are shown, and the spherical center angle corresponding to the square bars in the direction of the azimuth angle θ is 5°.

Figure 5:
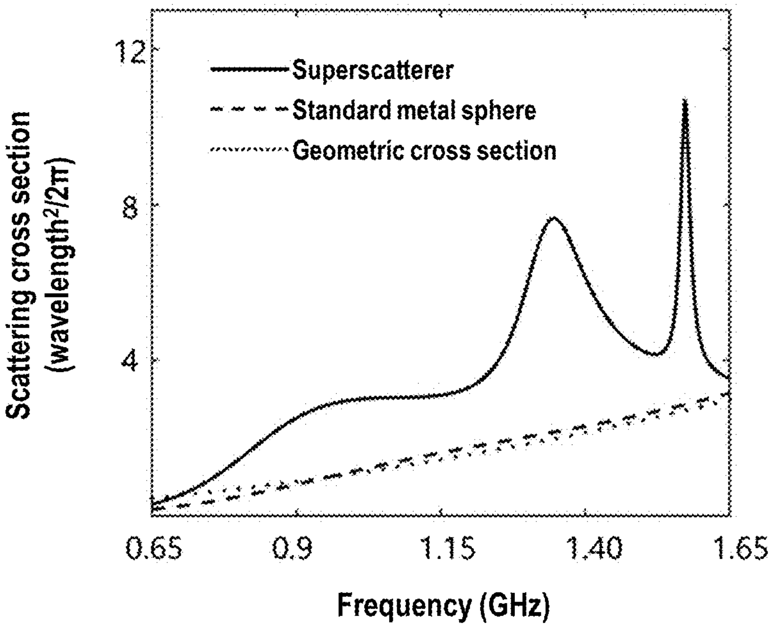
FIG. 5 is a graphic comparison of the total scattering cross sections between the electromagnetic wave superscattering device of the invention and a standard metal sphere of the same size.
Figure 6A:
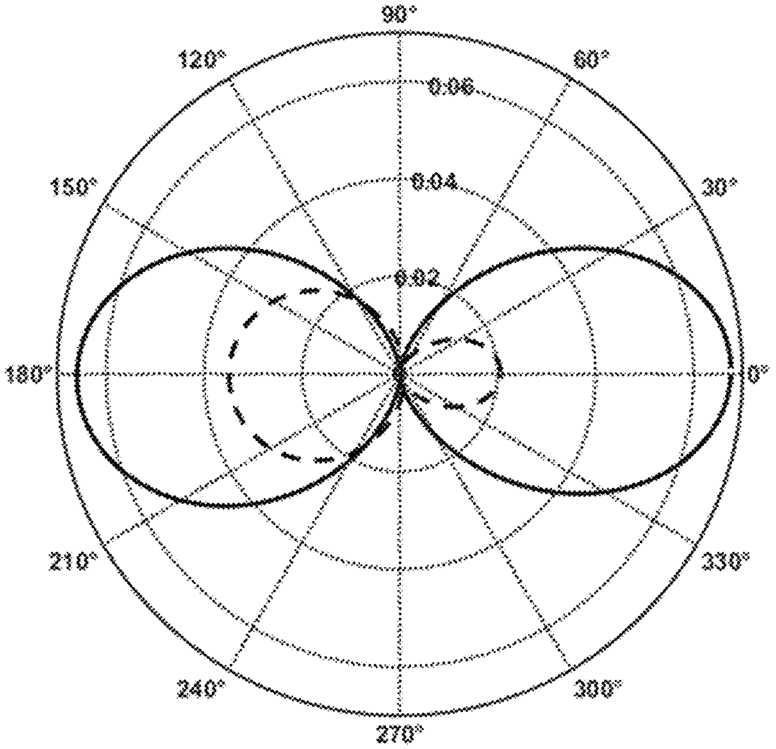
FIG. 6A is the E-plane pattern diagram at the first resonance peak of 0.9 GHz.
Figure 6B:
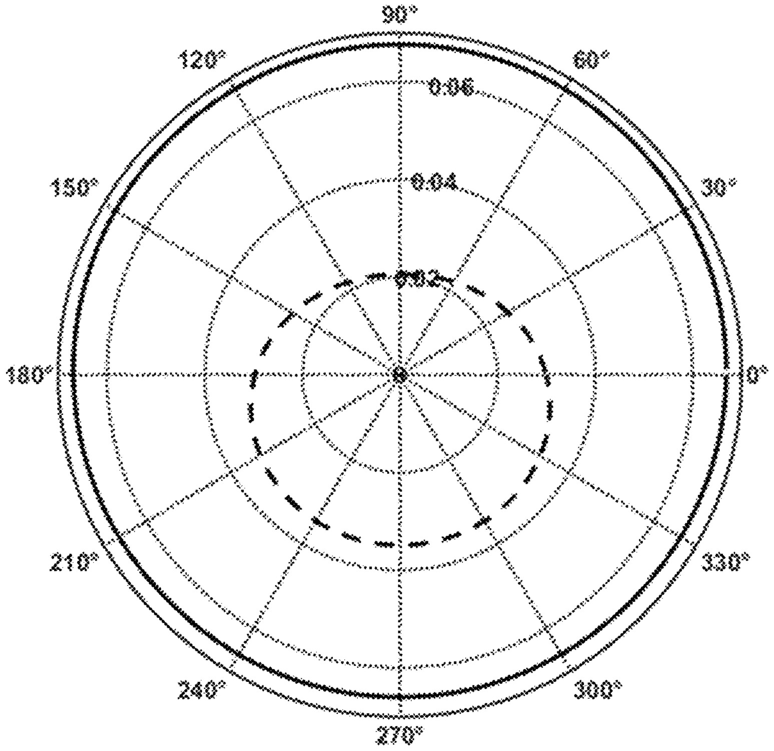
FIG. 6B is the H-plane pattern diagram at the first resonance peak of 0.9 GHz.
Figure 7A:
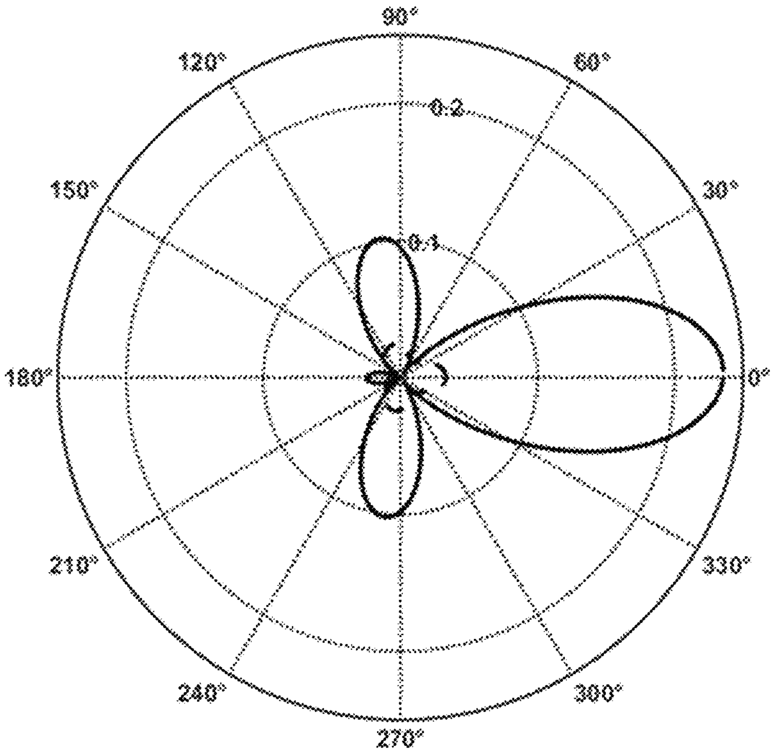
FIG. 7A is the E-plane pattern diagram at the second resonance peak of 1.35 GHz.
Figure 7B:
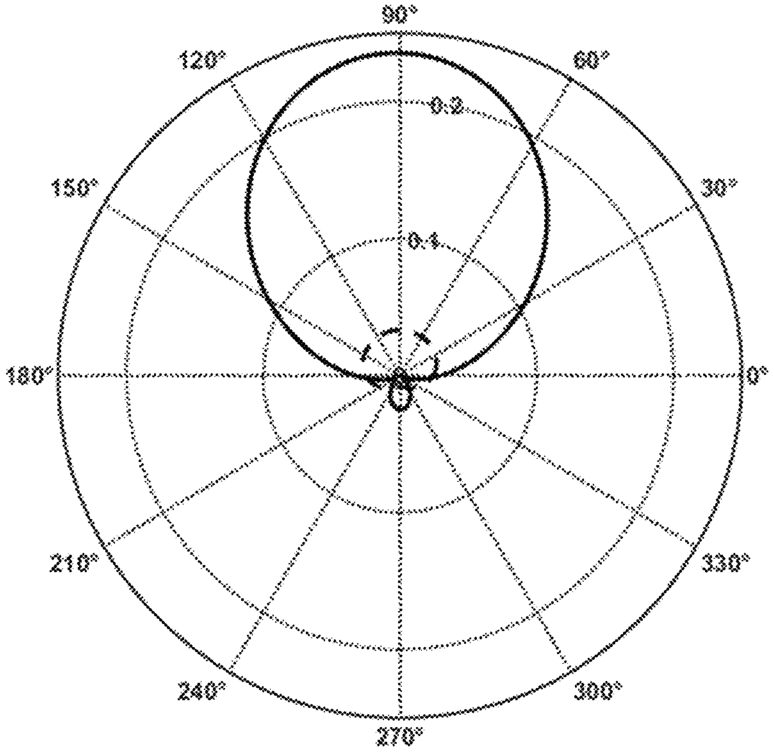
FIG. 7B is the H-plane pattern diagram at the second resonance peak of 1.35 GHz.
Figure 8A:
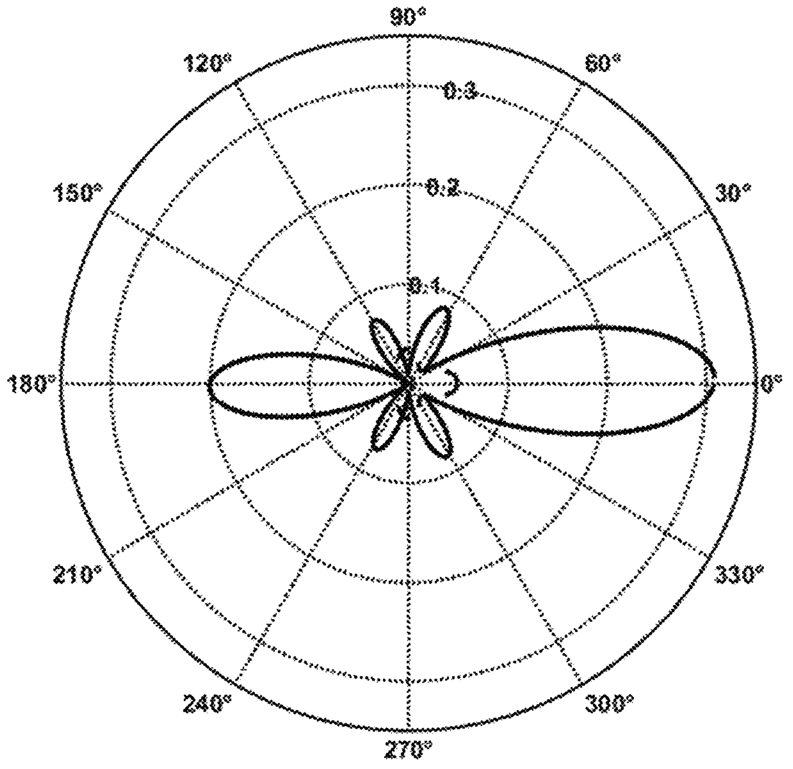
FIG. 8A is the E-plane pattern diagram at the third resonance peak of 1.53 GHz.
Figure 8B:
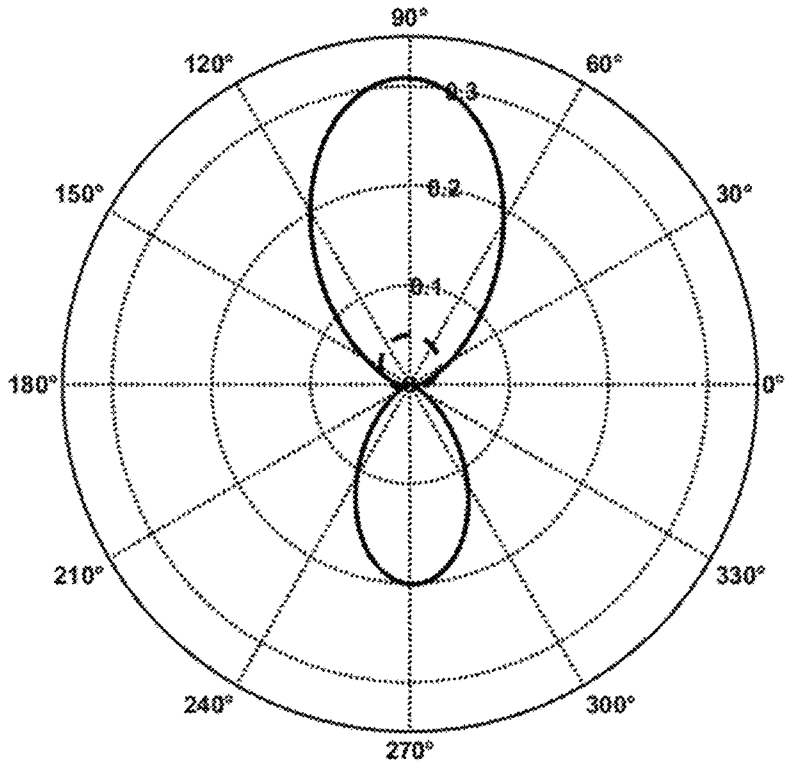
FIG. 8B is the H-plane pattern diagram at the third resonance peak of 1.53 GHz.

As shown in FIG. 5, the figure shows comparison between scattering cross section of: (1) an electromagnetic superscattering device of the disclosure with parameters r=15 mm h=35 mm, and α=0.5, (2) a standard metal sphere with a same outer radius R=50 mm and (3) their geometric cross section in a frequency range from 0.65 GHz to 1.65 GHz. At 0.9 GHZ, 1.35 GHz, and 1.53 GHz in the figure, the scattering cross section (solid line) of the spherical designer electromagnetic surface plasmon open resonator and the superscattering device is significantly larger than both the geometric cross section (dotted line) and the scattering cross section (dashed line) of a standard metal sphere of the same size, achieving an enhanced scattering effect.

As shown in FIG. 6A, FIG. 6B, FIG. 7A, FIG. 7B, FIG. 8A, and FIG. 8B, at 0.9 GHz, 1.35 GHZ, and 1.53 GHZ, the scattering width (solid line) of the spherical designer electromagnetic surface plasmon open resonator, and the superscattering device in both the E-plane and H-plane is much greater than the scattering cross section (dashed line) of a standard metal sphere of the same size, indicating that the spherical designer electromagnetic surface plasmon open resonator and the superscattering device can achieve enhanced scattering in all directions.

Figure 9:
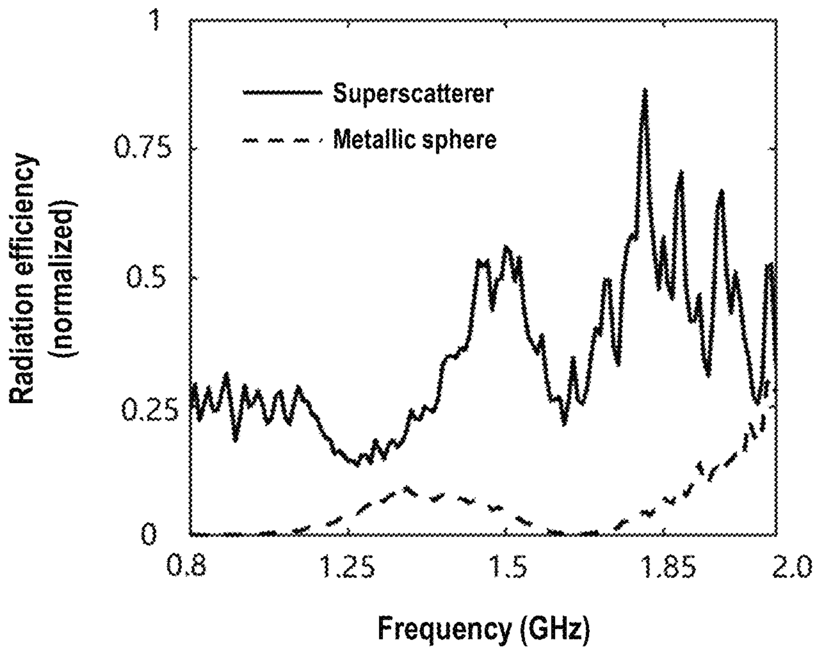
FIG. 9 is a schematic comparison diagram of the radiation efficiency between the spherical wide-aperture antenna of the disclosure (solid line) and the standard metal sphere of the same size (dashed line).

As shown in FIG. 9, by connecting a feed to the surface of the spherical designer electromagnetic surface plasmon open resonator and optimizing the feeding, a wide-aperture antenna can be realized. Compared to a standard metal sphere connected to the infeed (dashed line), the wide-aperture antenna based on the spherical designer electromagnetic surface plasmon open resonator may achieve more than 10 times the radiation efficiency at resonance peaks. According to the reciprocity principle of antenna, this resonator can improve antenna sensitivity when being used as a receiving antenna.

The aforementioned embodiments are merely preferred solutions of the disclosure, but the embodiments are not intended to limit the disclosure. A person having ordinary skill in the art can also make various changes and modifications without departing from the spirit and scope of the disclosure. Therefore, any technical solutions obtained by equivalent substitution or equivalent transformation fall within the protection scope of the disclosure.

What is claimed is:

1. A spherical designer electromagnetic surface plasmon open resonator, wherein comprising a resonator inner core and a resonator outer shell, wherein the resonator inner core is located at a central interior of the resonator outer shell, and the resonator inner core and the resonator outer shell are coaxial, wherein the resonator inner core is a sphere, the resonator outer shell comprises a plurality of fan-ring-shaped strip-shaped bars, one end of each strip-shaped bar in a length direction is an inner arc bottom surface of the strip-shaped bar, the other end of each strip-shaped bar in the length direction is an outer arc bottom surface of the strip-shaped bar, the strip-shaped bars are evenly distributed on a spherical surface of the resonator inner core in directions of an azimuthal angle θ and a polar angle ϕ with a duty cycle α, the inner arc bottom surfaces of the strip-shaped bars are evenly spaced in an array, distributed on the spherical surface of the resonator inner core as a whole, the outer arc bottom surface of each strip-shaped bar is away from the spherical surface of the resonator inner core, and the length direction of each strip-shaped bar is the same as a radius direction of the resonator inner core.

2. The spherical designer electromagnetic surface plasmon open resonator according to claim 1, wherein the resonator inner core and the resonator outer shell are specifically made of metal or resin materials.

3. The spherical designer electromagnetic surface plasmon open resonator according to claim 2, wherein when the resonator inner core and the resonator outer shell are made of resin materials, a surface of the open resonator is evenly covered with metal powder.

4. The spherical designer electromagnetic surface plasmon open resonator according to claim 1, wherein the resonator outer shell has an effective negative refractive index specifically as follows:

$$n = \sqrt{ò_r},$$

wherein $ò_r$ is the effective negative permittivity of the resonator inner core with a radius r of the resonator.

5. The spherical designer electromagnetic surface plasmon open resonator according to claim 4, wherein the negative permittivity of the resonator inner core with the radius r of the resonator is as follows:

$$\epsilon_r = 1 - \frac{f_p^2}{f^2},$$

wherein f is the operating frequency of the resonator, and $f_p$ is a designer plasma frequency of the resonator.

6. The spherical designer electromagnetic surface plasmon open resonator according to claim 1, wherein the open resonator has a scattering crosssection that is more than five times a geometric crosssection of the open resonator itself for linearly polarized electromagnetic waves incident from any direction.

7. Application of the open resonator according to claim 1, wherein the open resonator is used in application of a spherical superscattering device.

8. The application of the open resonator according to claim 1, wherein the open resonator is used in application of a spherical wide-aperture antenna.

9. A method of applying the open resonator according to claim 1, wherein the open resonator is used for application of scattering linearly polarized electromagnetic waves incident from any direction.

* * * * *